United States Patent [19]

Spadaro

[11] 4,026,265

[45] May 31, 1977

[54] CHARCOAL BURNER

[76] Inventor: Giorgio I. Spadaro, 221 Princeton Av-SE, Albuquerque, N. Mex. 87106

[22] Filed: June 11, 1975

[21] Appl. No.: 585,844

[52] U.S. Cl. .................... 126/25 B; 126/25 R
[51] Int. Cl.² .......................... F23Q 13/04
[58] Field of Search ............ 126/25 B, 25 R, 25 A, 126/25 AA, 59.5, 9 R, 9 B, 168; 110/1 F

[56] References Cited

UNITED STATES PATENTS

| | | | |
|---|---|---|---|
| 1,925,682 | 9/1933 | Upright et al. | 126/59.5 |
| 1,959,473 | 5/1934 | Heron | 126/25 B |
| 3,112,716 | 12/1963 | Knight | 110/1 F |
| 3,116,704 | 1/1964 | Byars, Sr. et al. | 126/25 B X |
| 3,307,506 | 3/1967 | Rose | 110/1 F |
| 3,384,066 | 5/1968 | Tufts | 126/9 R |
| 3,453,975 | 7/1969 | Gunter | 110/1 F |
| 3,814,035 | 6/1974 | Miller | 126/25 B X |
| 3,848,577 | 11/1974 | Storandt | 126/25 B |

Primary Examiner—William F. O'Dea
Assistant Examiner—Harold Joyce
Attorney, Agent, or Firm—Norman Lettvin

[57] ABSTRACT

Operative starting ignition of charcoal briquettes is achieved in a relatively short period of time by a charcoal burner constructed to provide a frusto-conical flue with diametrically opposed intake openings properly proportioned to the cross-section of the upper exhaust opening, and also by properly distributing apertures of different sizes in a grate that transversely intersects and divides the flue into upper and lower chambers. A novel construction for securing the grate in position is effected by formed elements on the periphery of the grate cooperating with selectively removable elements that attach exteriorly of the grate to extend interiorly thereof, the grate being manually selectively positionable in the flue through the open bottom thereof. A simple extension selectively attachable to the upper end of the flue provides a combination support and grate for receiving thereon items to be heated.

6 Claims, 5 Drawing Figures

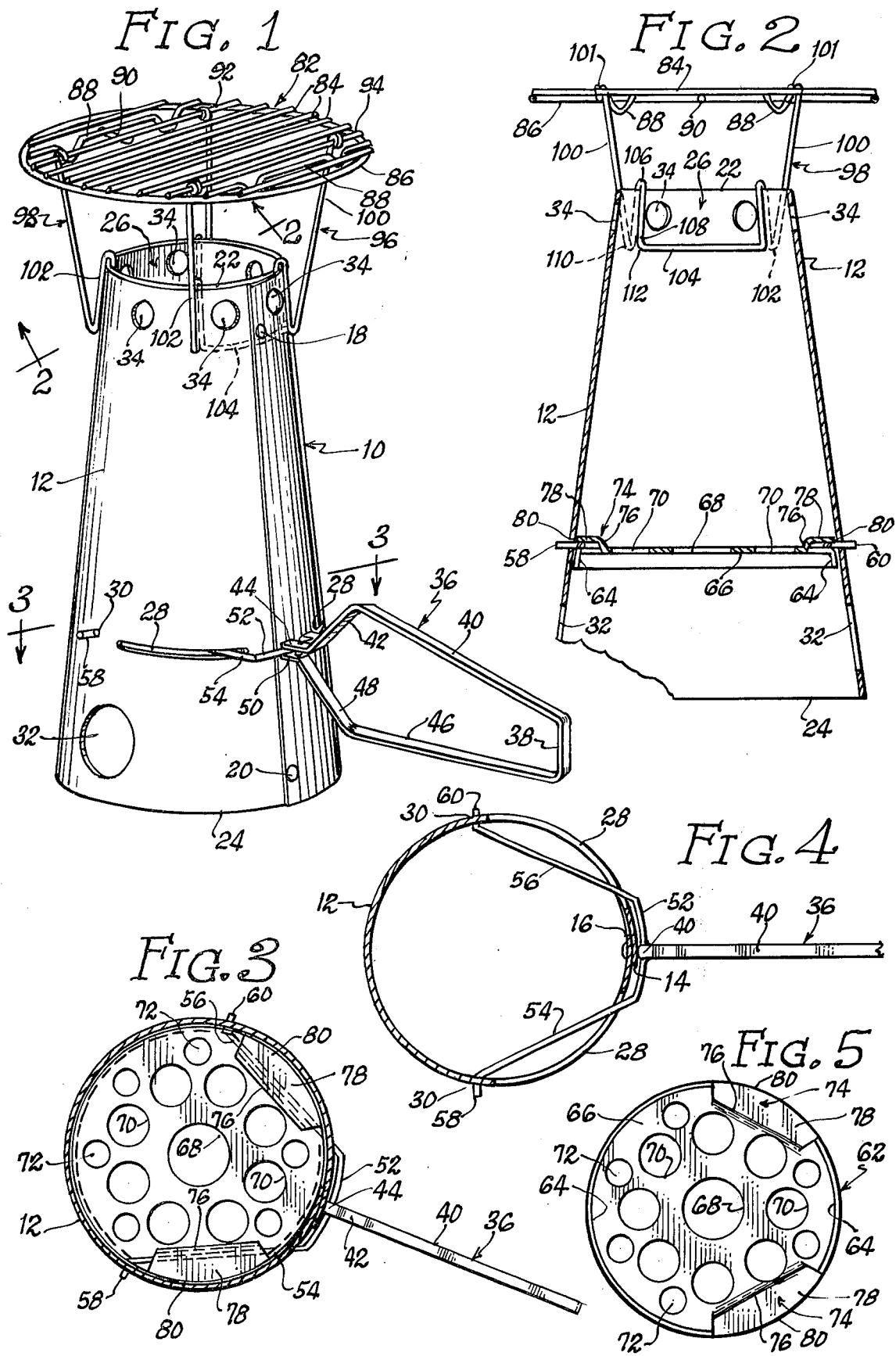

CHARCOAL BURNER

BRIEF DESCRIPTION OF THE DRAWINGS

FIG. 1 is a perspective view of a charcoal burner in accordance with the principles of the present invention;

FIG. 2 is a fragmentary, cross-sectional view taken substantially along line 2—2 of FIG. 1, which is on a plane substantially through the longitudinal axis of the flue;

FIG. 3 is a cross-sectional view taken substantially along the line 3—3 of FIG. 1, illustrating the top plan view of a grate in cooperative engagement with grate-supporting means;

FIG. 4 is a cross-sectional view similar to FIG. 3, but rotated slightly counterclockwise and illustrating the grate supporting means attached to the flue, but without the grate attached thereto, and illustrating the grate-supporting means as part of a flue-manipulating handle; and FIG. 5 is a bottom view of the grate removed from the environment of the flue.

BACKGROUND OF THE INVENTION

This invention relates to a portable charcoal burner, and more particularly to a combination charcoal lighter and cooking stove.

Heretofore, charcoal burners have been difficult to assemble, expensive to manufacture, not readily utilized as both a charcoal lighter and a cooking stove, and generally inefficient toward achieving full heat combustion in as short a time as possible. Prior attempts to provide a charcoal briquette ignition are shown in U.S. Pat. Nos. 3,116,704 and 3,167,040. Neither of those patents disclose devices that are selectively assemblable in the field, or that are designed to achieve most effective draft for efficient combustion. Other constructions of heating cooking devices and grates are shown in U.S. Pat. Nos. 950,414; 1,298,762; 1,966,945 and 2,920,614. None of these constructions provide the utility, efficiency and flexibility achieved by the invention herein.

It has been determined that uniformly sized openings in a grate are not normally operative to achieve most effective of efficient combustion or igniting of charcoal briquettes. In the instant invention the grate openings are not only of different sizes but are arranged to vary in size from greatest toward the center of the grate to least at the periphery of the grate.

It is one object of this invention to provide a charcoal igniter and/or cooker which includes a tapered flue with properly proportionally related intake and exhaust opening sizes, together with a grate with proportionally related grate openings, by means of which there is achieved maximum combustion in minimum time.

Another object of this invention is to provide a charcoal igniter construction consisting of a simple sheet metal flue of inexpensiveness of construction and efficiency of operation, with selectively attachable grate and grate-support attachments, that cooperate in a new and improved manner to provide a product of unusual simplicity.

It is another object of this invention to provide an improved charcoal burner which may be used as both a charcoal lighter and cooking stove.

A further object of this invention is to provide an improved charcoal burner which can fully ignite, say 18 to 25 charcoal briquettes, in approximately only 10 minutes.

It is still another object of this invention to provide an improved charcoal burner of relatively simple design and construction, which is relatively easy to assemble, inexpensive to manufacture, dependable in operation, readily installed and removed from operating position, and capable of performing properly after long periods of use.

This and other objects and advantages will become apparent from the following description and appended claims in conjunction with the accompanying drawings.

SUMMARY OF THE INVENTION

A portable stove is provided for achieving maximum combustion in minimum time. The stove includes an elongated truncated, simple, tubular metal flue tapered upwardly to form a constricted outlet adjacent the top end and punched through the side wall to provide air inlet means adjacent the lower end. Means are provided for carrying the stove. Spaced aperture means are provided through wall portions of the flue for receiving grate supporting means. The grate supporting means supports a grate located in a transverse plane between the ends of the flue. Portions of the grate supporting means are selectively enterable and removable from the spaced aperture means, while other portions are positioned for engagement with wall portions of the flue. Means operatively associated with the grate are provided for engaging opposite portions of the grate supporting means that enter within the flue to effect a substantial rigid assemblage of the grate to the flue.

DESCRIPTION OF THE ILLUSTRATIVE EMBODIMENT

Referring to FIGS. 1–4, a charcoal burner, generally 10, serves as a combination cooking stove and charcoal lighter. Burner 10 includes a tapered truncated tubular flue 12, preferably frusto-conical in shape, and formed from a generally flat pre-cut metal sheet, such as cold-rolled steel. Flue 12 has upwardly tapered lateral edges 14 and 16 which when joined together, as shown in FIG. 4, and secured together, such as by rivets 18 and 20, forms an elongated tapered seam. The pre-cut sheet metal blank for forming flue 12 has an upper end edge 22 and a lower end edge 24 that are concentric arcs. Upper edge 22 is shaped to form an upper exhaust constricted opening 26 when lateral edges 14 and 16 are secured together. Lower edge 24 is shaped to lie flat on the ground or on the charcoal-holding pan of a conventional barbecue burner. In one form of construction made, the upper exhaust opening 26 is four inches in diameter, the lower edge 24 is six and one-half inches in diameter, and the flue 12 has an 11½ inch height.

Flue 12 is shaped to provide a pair of spaced transverse elongated slots or apertures 28, preferably three and one-half inches above lower edge 24. A pair of diametrically opposed lug-receiving holes 30 are disposed in transverse circumferential alignment with slots 28. A pair of diametrically opposed intake openings 32 are positioned near lower edge 24 and proportionally related to upper exhaust opening 26. A plurality of circumferentially aligned upper-transverse outlet-openings 34 preferably six in number as shown in FIG. 1, are located generally adjacent upper edge 22. Upper openings 34 form an outlet for smoke and gaseous fumes generated by the fire and flue 12 which permits upper edge 22 to carry a cooking receptacle thereon, such as a pot or pan, without choking the discharge of gases from the flue.

Each of the intake openings 32 has an area approximately 10 percent of the area of upper exhaust opening 26. I have discovered that this ratio maximizes the effectiveness of burner 10. As the heat increases in burner 10, more air is demanded by the burning charcoal and combustible material creating a draft or suction so that the intake openings 32 because of their relatively small size and proportional relationship to upper exhaust opening 26 suck in air into burner 10 in increased velocity thereby giving more impetus to the flame as if someone were blowing on it.

A handle 36 is shaped of metal to form an outer vertical edge portion 38, an elongated top portion 40 tapered upwardly toward flue 12, a top section 42 extending downwardly from top portion 40 toward flue 12, an upper flange lip 44 extending inwardly from top section 42, an elongated bottom portion 46 tapered downwardly toward flue 12, a bottom section 48 tapered upwardly from bottom portion 46 toward flue 12, and a lower flanged lip 50 extending inwardly from bottom section 48, and located below upper flange lip 44. Handle 36 also includes a curved portion 52 complementing the curvature of flue 12 along a transverse plane intersecting slots 28. Curved portion 52 is secured between lips 44 and 50 and welded thereto. A pair of bifurcated grate-supporting members 54, formed of wire, extend from curved portion 52 into flue 12 through slots 28. Bifurcated grate support means provide members 54 and 56 which have a thickness slightly less than the vertical height of slots 28 to facilitate entry and removal of members 54 and 56 from flue 12. Members 54 and 56 are formed of metal and are normally biased to spread apart so that terminal studs or lugs 58 and 60 are urged outwardly to generally enter diametrically disposed holes 30 defined in the walls of flue 12.

A generally circular grate 62 is provided to carry charcoal briquettes or the like, and is of a size, shape and dimension to fit within and horizontally sub-divide the space enveloped by flue 12 into an upper chamber located above grate 62, and a lower chamber located below grate 62. Grate 62 is preferably formed of stamped sheet metal which is shaped to provide a rigidifying peripheral frusto-conical flange 64 that tapers outwardly and downward from charcoal-supporting web 66. Web 66 is perforated to form a plurality of sets of holes therein. In the specific example, the first set is only a single central hole 68 generally in the center of grate 62; the second set includes a first circular array of holes 70 radially outwardly of concentric with the first set; and the third set includes circular array of holes 72 radially outwardly of the second array 70 and concentric therewith. Each of the holes 70 in the second set is approximately equal in size and smaller than central hole 68. Each of the holes 70 of the second set have a large diametric size and dimension than the holes 72 of the third set. I have found that the location and proportional variation in size of holes 68, 70, and 72, as shown in FIGS. 3 and 5, increase the effectiveness of igniting the charcoal, and the resulting draft concentrates heat centrally of the flue and operates to keep handle 36 cooler.

Grate 62 is also shaped to provide a pair of bent tabs or engaging means, generally 74, which are adapted to cooperate with and grip members 54 and 56. In the illustrative embodiment, each of the tabs 74 comprise an offset or flange 76 extending upwardly from and above web 66 and a radially outwardly projecting arcuate segment 78 spaced above web 66 and cantilevered from the upper edge of flange 76. Arcuate segment 78 is generally resilient and tapered slightly upwardly from flange 76, terminating in an outermost arcuate edge 80 and so arranged as to easily receive in the space between flange 76 and web 66 members 54 and 56, with some pressure being applied as members 54 and 56 become wedged between said parts 76 and 66.

Grate 62 normally lies in a horizontal plane transverse to the longitudinal axis of flue 12. By rotating grate 62 clockwise in that horizontal plane, tabs 74 will overlie and engage members 54 and 56. Similarly, by rotating grate 62 counterclockwise, tabs 74 will disengage from members 54 and 56, so that grate 62 may be disconnected from the support means and withdrawn from flue 12 through the open bottom thereof.

A circular, support-grate 82 is a reticulate metal disc having a plurality of spaced horizontal bars 84 which are in substantial parallel relationship to each other and are carried by and securely welded to the top of circular rim 86. Bars 84 include a pair of inwardly projecting bars 88, substantially equal in size and positioned adjacent the outermost horizontal bars. Each of the inwardly projecting bars 88 are shaped to provide a pair of downwardly projecting loops, as shown in FIG. 1. A bar segment 90 is positioned perpendicularly to horizontal bars 84 generally along a centerline through circular rim 86 and is welded to the bottom of one of the downwardly projecting bars 88 and an inward horizontal bar 92 spaced inwardly adjacent projecting bar 88. A second inwardly horizontal bar 94 is of substantially the same length as the first inwardly horizontal bar 92 and is spaced inwardly adjacent the one of the downwardly projecting bars 88 which does not carry bar segment 90.

The support-grate 82 has leg means constructed and arranged to effect a slip-on type frictional grip upon the edge 22 of flue 12 such that grate 82 is spaced above the upper edge 22. Support-grate 82 is disposed to lie in a horizontal plane transverse to the longitudinal axis of flue 12 and is adapted to carry a cooking receptacle, such as a pot or pan, thereon. In the illustrative embodiment, second grate 82 is positioned two inches above upper edge 22. The leg means include a pair of pivotable support members 96 and 98 formed of wire and adapted to be folded against second grate 82 for storage. Support members 96 and 98 are pivotally attached to horizontal bars 92 and 94 such that the support members 96 and 98 project downwardly toward flue 12, as best shown in FIGS. 1 and 2.

Each of the support members 96 and 98 have a pair of inwardly tapered leg portions 100 having its upper end 101 pivotally wrapped around inwardly horizontal bar 92 or 94. A pair of S-shaped flexible loops 102 extend inwardly from the bottom of leg portions 100 and are interconnected by a horizontal leg segment 104. Each of the S-shaped flexible loops 102 include an upper apex 106 of an upper loop portion 108. Bottommost portions 106 and 108 of upper loop 108 are biased toward each other to provide an opening slightly less than the thickness of upper edge 22 so as to frictionally engage and grip the same.

Overlapping tapered seam 14 lies in a common longitudinal plane with handle 36 such that the common longitudinal plane is perpendicular to the common central axis joining intake openings 32. Handle 36 is so secured to flue 12 that it may be used to manipulate flue 12 as desired and so as to dump the coals that have substantially achieved full heat into a dish-shaped pan (not shown) of a conventional barbecue-type charcoal burner when using burner 10 as a charcoal lighter.

In operation, burner 10 makes full use of the Venturi principle. Charcoal briquettes are dropped into exhaust opening 26, forming a tapered stack on grate 62. A newspaper sheet is crumpled and placed in the lower chamber beneath grate 62. A lit match inserted into one of the intake openings 32 operates to ignite the newspaper. The burning newspaper and shape of flue 12 effects a draft and will quickly ignite and bring 18 to 25 charcoal briquettes to full heat in approximately 10 minutes from the time that the newspaper is ignited. Burner 10 operates as a charcoal lighter when the fully heated charcoal is dumped onto another charcoal barbecue burner as previously described. Burner 10 operates as a cooking stove when the fully heated coals are kept on grate 62 and a cooking receptacle is placed on either upper edge 22 or second grate 82.

Those skilled in the art will appreciate that a charcoal burner has been shown and described, which operates as both a charcoal lighter and a camping stove, and which achieves fully heated charcoal briquettes in a relatively short period of time due to its unique construction and design. It can be seen that the proportional relationship of the size of intake openings 32 to the size of exhaust opening 26 and the proportional sizes and arrangement of holes 68, 70 and 72, as well as the size and configuration of flue 12, all contribute to achieving a highly efficient charcoal burner 10.

Although an embodiment of the invention has been shown and described, it is to be understood that various modifications and substitutions may be made by those skilled in the art without departing from the novel spirit and scope of the invention.

What is claimed is:

1. In a portable charcoal igniting and burning stove of the type including an elongated sheet metal body constructed to define a generally frusto-conical upright flue that provides a constricted opening at the upper end thereof, a grate within the flue lying in a plane transverse to the longitudinal axis of said body and at a position spaced intermediate the upper and lower ends thereof to define a space below the grate in which combustion of readily ignitable material may be initiated and a space above the grate in which igniting of charcoal is to take place, aperture means in the side walls of the flue below the grate through which material below the grate may be ignited and through which air is drawn by the upward draft through the flue, and handle means for carrying the flue and for manipulating the flue, to dump ignited charcoal therefrom through said constricted opening, the improvement comprising, in combination: the flue having mounting aperture means in the walls thereof in a plane transverse to the longitudinal axis of the flue and adjacent the position at which the grate is to be located, the handle means including a pair of mounting members separate from the flue and constructed for cooperation with portions of the flue adjacent said mounting aperture means for both selectively securing the handle means to the flue and for providing within the flue a pair of spaced grate support members, a removable grate, of a size and area greater than the dimension and area of the constricted opening at the upper end of the flue, mounted within the flue to support thereon charcoal that is to be ignited, and the grate having securement means thereon for effecting selective manual securement of the grate to the pair of grate support members to suspend the grate within the flue from said grate support members, the grate being generally circular and the securement means comprising a pair of spaced segments on the grate offset upwardly from the plane of the remainder of the grate, so that upon pivoting of the grate about its center in the generally horizontal plane of said grate support members, said support members become embraced between said segments and the remainder of the grate to provide a selectively separable connection therebetween.

2. A stove as set forth in claim 1 wherein the grate and the means thereon for effecting securement of the grate to the support members are of a size to be spaced inwardly of the walls of the flue when in operative position within the flue, so that the generally circular grate is pivotable about its center in one direction for effecting securement thereof to the grate support members and is pivotable in the opposite direction about its center to effect release of the grate from the grate support members.

3. A stove as in claim 1 wherein air flow passageways are provided through and around the edges of the grate and operate to concentrate the heat of combustion centrally of the flue, with a flow of relatively cooler draft air surrounding same and adjacent the inner wall of the flue, to thereby reduce the degree of heat radiated toward the handle means when the charcoal is burning.

4. A stove as in claim 3 wherein the grate includes a perforated web for supporting thereon charcoal briquettes being combusted, and wherein said grate web is provided with a plurality of air flow apertures therethrough arranged with the air flow aperture of largest area located in the center of the web and with openings of decreasing area size positioned radially further from the center of the web, whereby to provide lesser resistance to air flow in the center of the flue.

5. A stove as in claim 3 wherein the aperture means in the flue below the grate and an aggregate area of approximately only 20 percent of the area of the constricted opening at the upper end of the flue.

6. A stove as in claim 3 wherein the grate is provided with air flow apertures therethrough including a relatively large hole in the center of the grate, a first circular array of similarly sized holes located radially outwardly of the central hole and coaxial therewith, a second circular array of similarly sized holes radially outward of the first array and coaxial therewith, each of the holes in the first array being smaller than the central holes and larger than each of the holes in the second array.

* * * * *